United States Patent [19]

Hibi et al.

[11] Patent Number: 4,960,004
[45] Date of Patent: Oct. 2, 1990

[54] CONTINUOUSLY VARIABLE TRACTION ROLLER TRANSMISSION

[75] Inventors: Toshifumi Hibi, Yokosuka; Masaki Nakano, Kawasaki, both of Japan

[73] Assignee: Nissan Motor Co., Ltd., Yokohama City, Japan

[21] Appl. No.: 352,309

[22] Filed: May 16, 1989

[30] Foreign Application Priority Data

May 17, 1988 [JP] Japan .................. 63-120342

[51] Int. Cl.⁵ ............................................. F16H 15/38
[52] U.S. Cl. ..................................... 74/200; 74/190.5; 74/569
[58] Field of Search ............... 74/200, 213, 190.5, 74/569

[56] References Cited

U.S. PATENT DOCUMENTS

| | | | |
|---|---|---|---|
| 4,086,820 | 5/1978 | Kraus et al. | 74/200 |
| 4,385,536 | 6/1983 | Kraus | 74/200 |
| 4,434,675 | 3/1984 | Kraus | 74/200 |
| 4,501,172 | 2/1985 | Kraus | 74/867 |
| 4,526,051 | 7/1985 | Kraus | 74/200 |

FOREIGN PATENT DOCUMENTS

| | | | |
|---|---|---|---|
| 61-31755 | 2/1986 | Japan | 74/200 |
| 61-127964 | 6/1986 | Japan | 74/200 |
| 61-127965 | 6/1986 | Japan | 74/200 |
| 62-283256 | 12/1987 | Japan | . |
| 63-318356 | 12/1988 | Japan | . |

Primary Examiner—Allan D. Herrmann
Attorney, Agent, or Firm—Foley & Lardner, Schwartz, Jeffery, Schwaab, Mack, Blumenthal & Evans

[57] ABSTRACT

In a continuously variable traction roller transmission, a combination of a precess cam and a generally L-shaped link is used for converting a rotational movement of a traction roller supporting member to an axial movement of a spool of a speed change control valve. The cam surface of the precess cam is convexed to achieve an optimum characteristic of speed change ratio.

5 Claims, 5 Drawing Sheets

CONTINUOUSLY VARIABLE TRACTION ROLLER TRANSMISSION

BACKGROUND OF THE INVENTION

1. Field of the Invention

The present invention relates in general to automotive transmissions, and more particularly to transmissions of a continuously variable traction roller type.

2. Description of the Prior Art

Hitherto, various transmissions have been proposed and put into practical use particularly in the field of motor vehicles. One of them is a so-called "continuously variable traction roller transmission" which has motion transmitting traction rollers disposed between, and in engagement with, opposite toroidal input and toroidal output discs. Under operation of the transmission, the torque applied to the toroidal input disc from a prime mover (for example, an automotive engine) is transmitted through the traction rollers to the toroidal output disc.

During this, the rotation speed change ratio between the toroidal input and output discs is infinitely varied depending on the angle at which each traction roller inclines with respect to a common axis on which the input and output discs are arranged.

Japanese Pat. First provisional Publication No. 62-283256 shows one of the transmissions of the above-mentioned type. In the transmission of this publication, each traction roller is pivotally held, through an eccentric shaft, by a roller supporting member, so that an axial movement of the roller supporting member induces inclination of the traction roller.

The axial movement of the roller supporting member is effected by a hydraulic actuator to which an hydraulic pressure from a change speed control valve is applied. That is, the moved distance of the roller supporting member (viz., the inclination angle of the traction roller) is controlled by the hydraulic pressure applied to the hydraulic actuator.

The control valve comprises a sleeve whose axial movement is controlled by a speed change instruction means, such as a step motor or the like, and a spool which is mutually slidably received in the sleeve and axially moved in response to a rotational movement of the roller supporting member. When the sleeve and the spool are in their mutually neutral positions, the roller supporting member assumes its neutral position wherein the rotation speed change ratio between the input and output discs is 1 : 1. When the sleeve and the spool are moved away from the neutral positions in one or the other direction, the hydraulic pressure applied to the hydraulic actuator is increased thereby to incline the traction roller in a direction to increase or decrease the rotation speed change ratio.

A process cam is employed for converting the rotational movement of the roller supporting member to an axial movement of the spool against the above-mentioned movement of the sleeve, so that the spool is actuated in a direction to decrease the above-mentioned increased hydraulic pressure. That is, following the movement of the sleeve, the spool is moved against the movement of the sleeve, so that consequently the inclination angle of the traction roller is determined by an instruction value issued from the speed change instruction means, viz., step motor.

However, the above-mentioned transmission has the following drawbacks due to the inherent structure of the process cam employed therein.

That is, the cam surface of the process cam is shaped flat, so that the moved distance of the spool of the control valve is in proportion to the rotational movement of the roller supporting member, viz., the inclination angle of the traction roller. Accordingly, the increasing or decreasing rate of hydraulic pressure from the control valve is kept constant throughout the rotational movement of the roller supporting member, so that, as is shown in FIG. 8, the inclination angle 6 of the traction roller relative to the instruction value from the speed change instruction means (that is, relative to the number of steps of the step motor) becomes constant. Accordingly, as is understood from the graph of FIG. 9, the rotation speed change ratio has such a characteristic that under a speed increasing condition, the change rate of the speed change ratio is small, while under a speed decreasing condition, the same is large. This induces however that when the step motor is operated to run at a constant speed throughout the entire steps, the change of engine speed and that of the speed change ratio become ill-matched particularly at the time when the vehicle is being accelerated just after starting or subjected to a kickdown operation. The ill-matching makes the driver feel uncomfortable.

That is, under the vehicle being accelerated just after starting, the engine speed is greatly changed when, in response to a speed change operation of the transmission, the speed change operation is transferred from a speed reducing mode to a speed increasing mode. However, instantly, the engine speed change rate is reduced. Thus, underoutput of the engine is felt by the driver.

Furthermore, when, upon the vehicle being subjected to a kickdown, the speed change operation is transferred from a speed increasing mode to a speed reducing mode, the change in engine speed is small at an initial stage because the reducing rate of the speed change ratio is small, but tho change in the engine speed becomes great suddenly thereafter because the speed change becomes quick thereafter. This causes generation of an undesired acceleration shock of the transmission.

SUMMARY OF THE INVENTION

It is therefore an object of the present invention to provide a continuously variable traction roller transmission which is free of the above-mentioned drawbacks.

According to the present invention, there is provided a continuously variable traction roller which is simple in construction.

According to the present invention, there is provided a continuously variable traction roller transmission in which an optimum characteristic of speed change ratio is obtained by only modifying a process cam which is conventionally used.

According to the present invention, there is provided a continuously variable traction roller transmission which comprises a casing; input and output toroidal discs arranged in the casing to face each other; a pair of traction rollers each being disposed between and in engagement with the input and output discs; roller supporting members respectively supporting the traction rollers through respective eccentrical shafts, each roller supporting member being so arranged that when moved axially, the member is rotated about its axis while pivoting the corresponding traction roller; hydraulic actuators for axially moving the respective roller supporting members; a precess cam connected to one of the roller supporting members to move therewith; a speed change instruction means; a speed change control valve including a first member which is axially moved by the speed change instruction means and a second member which is movable coaxially relative to the first member, the control valve feeding the hydraulic actuators with hydraulic pressure whose magnitude depends on the relative displacement between the first and second members: a L-shaped pivotal link having one end pivotally connected to the second member and the other end operatively contacting with a cam surface of the process cam; and means defined by the cam surface of the process cam, the means increasing the rate of an axial movement of the second member to a rotational movement of the roller supporting member when the traction rollers are in a condition for reducing the speed but decreasing the rate when the traction rollers are in a condition for increasing the speed.

BRIEF DESCRIPTION OF THE DRAWINGS

Other objects and advantages of the present invention will become apparent from the following description when taken in conjunction with the accompanying drawings, in which:

FIG. 8 is a graph similar to FIG. 6, but showing the relationship which has been practically used in a conventional transmission; and FIG. 9 is a graph similar to FIG. 7, but showing the relationship possessed by the conventional transmission.

DETAILED DESCRIPTION OF THE INVENTION

Referring to FIGS. 1 to 4, there is shown a continuously variable traction roller transmission of the present invention, which is generally designated by numeral 10.

Figure 3:
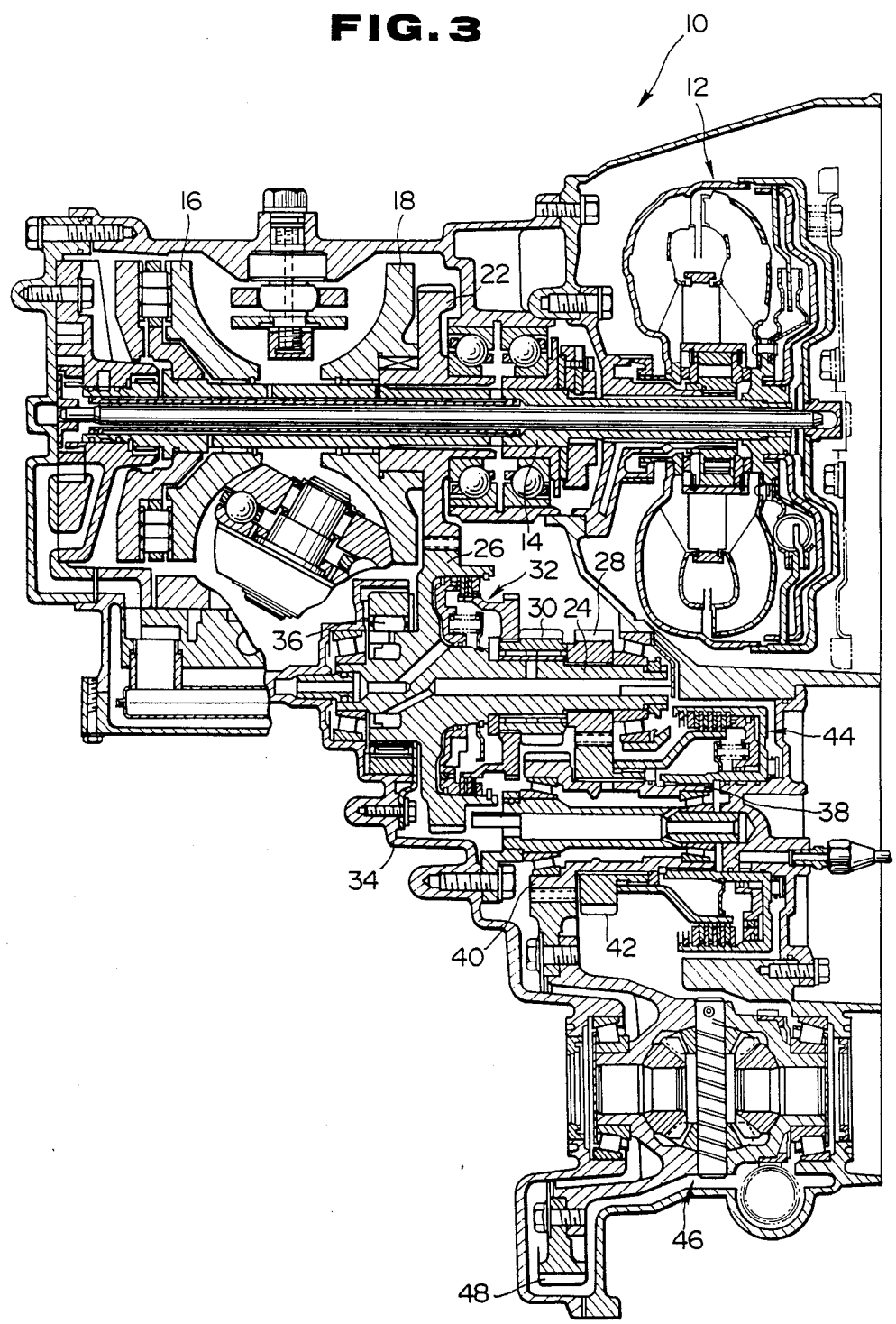
FIG. 3 is a sectional view of the entire transmission of the present invention.

The entire construction of the transmission 10 is shown in FIG. 3. As will be understood from this drawing, an output torque from an engine (which is arranged at a right side of the drawing) is transmitted through a torque converter 12 to an input shaft 14. Input and output toroidal discs 16 and 18 are disposed about the input shaft 14 in a manner to face each other.

Figure 1:
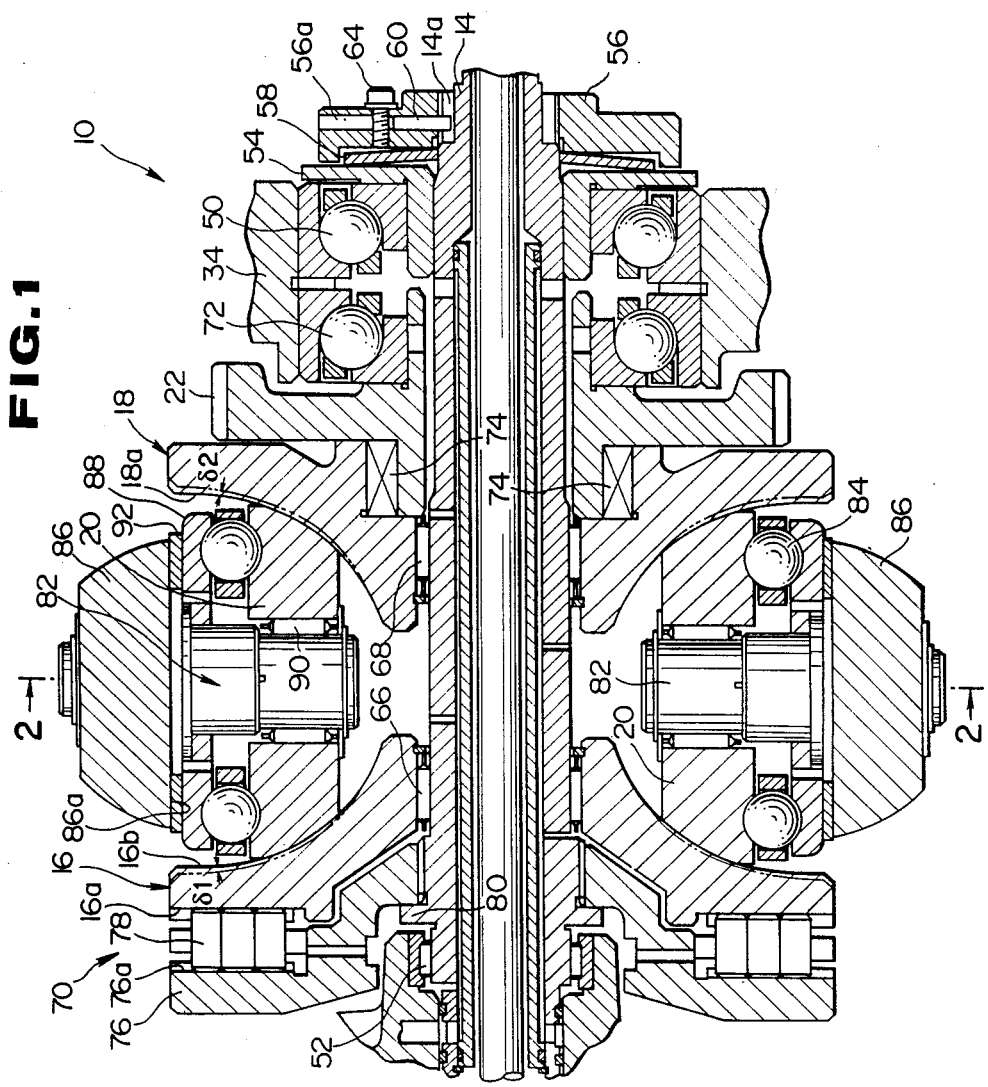
FIG. 1 is a sectional view of an essential portion of a continuously variable traction roller transmission of the present invention.

As is best seen from FIG. 1, a pair of traction rollers 20 are disposed between and in engagement with the opposite input and output discs 16 and 18.

Figure 2:
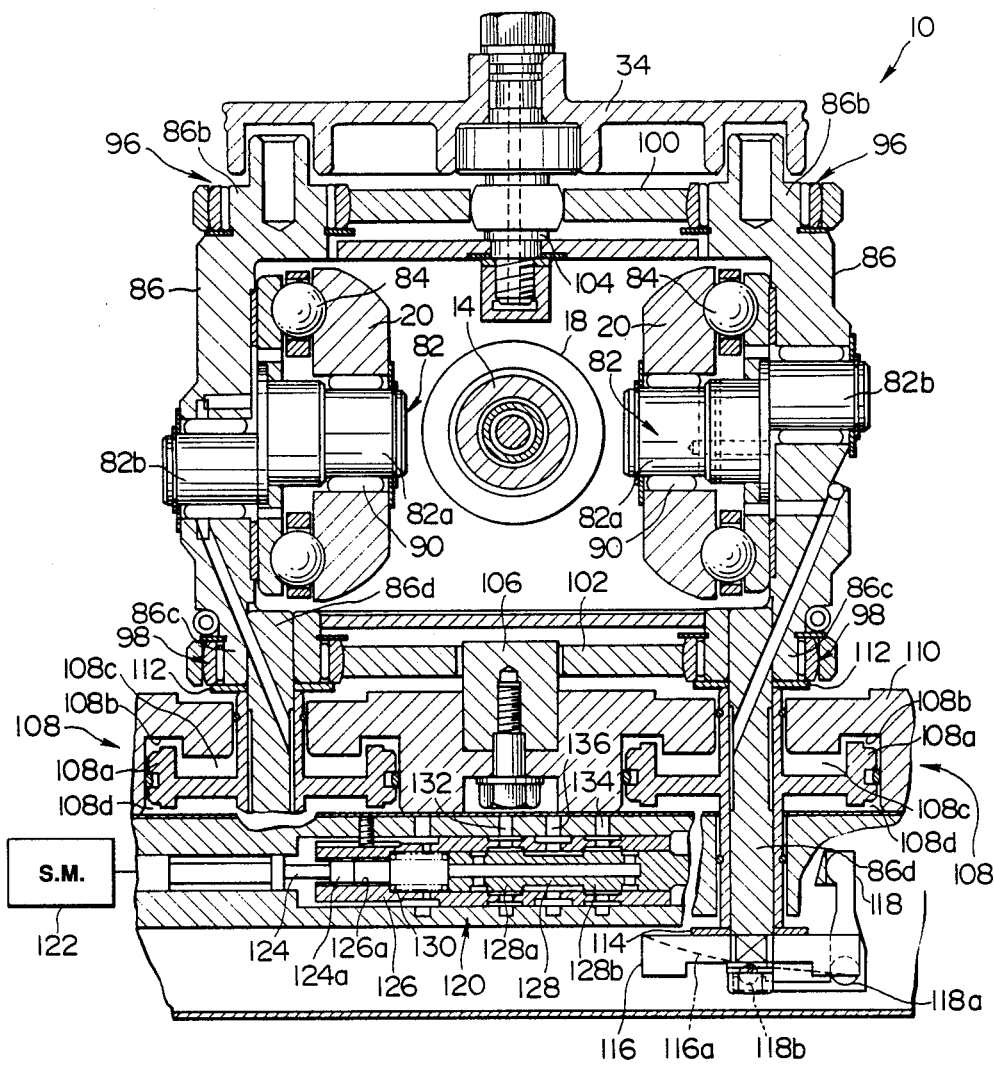
FIG. 2 is a sectional view taken along the line II—II of FIG. 1.

The input disc 16 is applied with both a biasing force produced by an after-mentioned disc spring 58 and a biasing force produced by an after-mentioned loading cam structure 70. The torque of the input shaft 14 is transmitted through the loading cam structure 70 to the input disc 16. The torque thus transmitted to the input disc 16 is transmitted through the paired traction rollers 20 to the output disc 18. During this, the rotation speed change ratio between the input and output discs 16 and 18 is infinitely varied depending on the angle at which each traction roller 20 inclines relative to the axis of the input shaft 14. The pivotal movement of each traction roller 20 is controlled by an after-mentioned actuating mechanism which is shown in FIG. 2.

The output disc 18 has a gear 22 rotated therewith. As is seen from FIG. 3, the gear 22 is meshed with another gear 26 which is integral with an idler shaft 24. The idler shaft 24 has both a gear 28 rotated therewith and another gear 30 rotatably disposed thereabout. Between the idler shaft 24 and the gear 30, there is arranged a reverse clutch 32.

The idler shaft 24 is permitted to rotate in only one direction, viz., in a forward direction, by a one-way clutch 36 which is held by a casing 34.

Another idler shaft 38 is arranged in parallel with the idler shaft 24. The idler shaft 38 has both a gear 40 rotated therewith and another gear 42 rotatably disposed thereabout. Between the idler shaft 38 and the gear 42, there is arranged a forward clutch 44.

The gears 28 and 42 are constantly meshed with each other, while the gears 30 and 40 are constantly meshed with a final gear 48 of a differential gear 46.

Accordingly, when the forward clutch 44 is engaged, the rotation of the gear 22 is transmitted through the gear 26, the idler shaft 24, the gears 28 and 42, the forward clutch 44, the idler shaft 38 and the gear 40 to the final gear 48 thereby to rotate the differential gear 46 in a normal direction. With this, drive wheels (not shown) of the vehicle are rotated to move the vehicle forward.

When, with the forward clutch 44 disengaged, the reverse clutch 32 is engaged, the rotation of the gear 22 is transmitted through the gear 26, the reverse clutch 32 and the gear 30 to the final gear 48 thereby to rotate the differential gear 46 in a reverse direction. With this, the drive wheels are rotated to move the vehicle rearward.

As is best seen from FIG. 1, the input shaft 14 is rotatably held in the casing 34 through a ball bearing 50 and a needle bearing 52.

Between the input shaft 14 and the ball bearing 50, there is disposed a spacer 54, and between the spacer 54 and a loading nut 56 screwed to the input shaft 14, there is compressed a disc spring 58. The force produced by the disc spring 58 biases the input shaft 14 rightward, as viewed in FIG. 1, through the loading nut 56. A stopper pin 60 from the loading nut 56 falls into a groove 14a of the input shaft 14 to suppress looseness of the loading nut 56. For receiving the stopper pin 60, the loading nut 56 and the input shaft 14 are respectively formed with a plurality of radial bores 56a and a plurality of grooves 14a. That is, by receiving the stopper pin 60 into any mated pair of the bores 56a and the grooves 14a, the position of the loading nut 56 relative to the input shaft 14 can be adjusted. Designated by numeral 64 is a bolt by which the stopper pin 60 is prevented from disconnection from the bore 56a.

The input and output discs 16 and 18 are rotatably disposed about the input shaft 14 through respective needle bearings 66 and 68. The loading cam structure 70 is arranged between the input disc 16 and the input shaft 14. The output disc 18 is connected through a key 74 to the gear 22 which is rotatably held in the casing 34 through a ball bearing 72. The input disc 16 is permitted to make a slight axial movement relative to the input shaft 14.

The loading cam structure 70 comprises a cam flange 76 connected through serrations to the input shaft 14 and cam rollers 78 disposed between the cam flange 76 and the input disc 16. Designated by numerals 76a and 16a are cam surfaces which are formed formed on the cam flange 76 and the input disc 16 for engagement with the cam rollers 78. The cam flange 76 is prevented from moving leftward in FIG. 1 by an annular projection 80 formed on the input shaft 14.

As has been described hereinabove, the torque of the input shaft 14 is transmitted through the loading cam structure 70 to the input disc 16. When a relative rotation occurs between the cam flange 76 and the input disc 16, the loading cam structure 70 functions to produce a biasing force with which the cam flange 76 and the input disc 16 are biased away from each other, that is, in that case, the loading cam structure 70 functions to bias the input disc 16 toward the output disc 18.

Each traction roller 20 is pivotally supported by a roller supporting member 86 through an eccentric shaft 82 and a ball bearing 84.

As is seen from FIG. 2, each eccentric shaft 82 comprises two mutually eccentric portions, one being an inboard portion 82a for rotatably supporting the traction roller 20, and the other being an outboard portion 82b for being rotatably supported by the roller supporting member 86. As is understood from FIG. 2, the two eccentric shafts 82 and 82 are so arranged that the inboard portions 82a and 82a are coaxially arranged and the outboard portions 82b and 82b are eccentrically arranged. When the roller supporting member 86 is moved in a direction perpendicular to the surface of FIG. 1, the eccentric shaft 82 is rotated causing a pivotal movement of the traction roller 20.

Each ball bearing 84 is arranged between the traction roller 20 and a flange portion 88 of the eccentric shaft 82, so that due to provision of the ball bearing 84 and a needle bearing 90 provided between the inboard portion 82a of the eccentric shaft 82 and the traction roller 20, the traction roller 20 can rotate freely.

Between the flange portion 88 and the roller supporting member 86, there is sandwiched a metal plate 92 through which the eccentric shaft 82 and the roller supporting member 86 make relative rotation upon pivotal movement of the traction roller 20. A load applied to the traction roller 20 is thus supported by the roller supporting member 86 through the ball bearing 84, the flange portion 88 and the metal plate 92.

In the following, an actuating mechanism for the roller supporting member 86 will be described in detail with reference to FIG. 2.

Each roller supporting member 86 has upper and lower bearing portions 86b and 86c which are supported by respective link members 100 and 102 through spherical bearings 96 and 98. The link member 100 is supported by a link post 104 fixed to the casing 34, while the other link member 102 is supported by another link post 106 which is fixed to a valve body 110 of an aftermentioned speed change control valve 120.

Each roller supporting member 86 has an extended shaft portion 86d which is coaxial with the lower bearing portion 86c. The shaft portion 86d has a piston 108a connected thereto, which piston forms part of a hydraulic actuator 108. That is, the piston 108a is slidably and sealingly received in a cylinder 108b defined by the valve body 110, so that two hydraulic chambers 108c and 108d are defined in the cylinder 108b. A hollow stem part of the piston 108a has an upper edge portion engaged with the roller supporting member 86 with an interposal of a spacer 112 herebetween.

As is seen from FIG. 2, one of the shaft portions 86d and 86d has a process cam 116 fixed to a leading end thereof. A lower edge portion of the hollow stem part of the corresponding piston 108a is engaged through a spacer 114 with the process cam 116.

Actuated by the process cam 116 is a link 118. That is, when, due to a rotational movement of the roller supporting member 86, the process cam 116 is rotated, the link 118 is pivoted moving an after-mentioned spool 128.

That is, the link 118 is of a generally L-shaped structure and pivotally connected at its middle part to the valve body 110 through a pivot pin 118a. A roller 118b is mounted on a leading end of one arm portion of the link 118 and rotatably put on a cam surface 116a of the process cam 116.

The valve body 110 is equipped with a speed change control valve 120 from which a controlled hydraulic pressure is supplied to the hydraulic actuator 108. The control valve 120 comprises a drive rod 124 which is rotatably driven by a step motor 122, a sleeve 126 which is permitted to make an axial movement relative to the valve body 110, a spool 128 which is slidably received in the sleeve 126 and a spring 130 which biases the spool 128 rightward in FIG. 2. The step motor 122 serves as a so-called "speed change instruction means", the sleeve 126 serves as a first member, and the spool 128 serves as a second member.

The drive rod 124 has at its leading end an externally threaded head portion 124a which is operatively engaged with an internally threaded bore 126a of the sleeve 126. Thus, when the drive rod 124 rotates about its axis, the sleeve 126 is moved axially.

The step motor 122 is of a reversable type, so that the sleeve 126 can move leftward or rightward from the illustrated neutral position.

A rightwardly projected end of the spool 128 is pivotally engaged with the other arm portion of the L-shaped link 118. Due to biasing force of the spring 130, the link 118 is caused to constantly contact the roller 118b thereof with the cam surface 116a of the process cam 116.

The spool 128 comprises axially spaced two land portions 128a and 128b. By these land portions, the opening degree of each port connected to a hydraulic passage 132 or 134 is controlled. A line pressure in a hydraulic passage 136 is distributed to the hydraulic passages 132 and 134 suitably through the ports.

The hydraulic passage 132 is connected to both the right side hydraulic chamber 108d (as viewed in FIG. 2) and the left side hydraulic chamber 108c while the hydraulic passage 134 is connected to both the right side hydraulic chamber 108c and the left side hydraulic chamber 108d, so that when controlled hydraulic pressure is supplied from the control valve 120 to the right and left hydraulic actuators 108 and 108 through the hydraulic passages 132 and 134, the two actuators 108 and 108 move the right and left roller supporting members 86 and 86 vertically but in opposite directions.

Accordingly, when, for the purpose of changing the speed change ratio, the step motor 122 is energized to effect a relative displacement between the sleeve 126 and the spool 128, there is produced in the hydraulic passages 132 and 134 a controlled hydraulic pressure whose magnitude corresponds to the degree of the relative displacement. With this, the hydraulic actuators 108 and 108 pivotally move the roller supporting members 86 and 86 and thus incline the traction rollers 20 and 20.

In response to the rotational movement of the right side roller supporting member 86, the process cam 116 is rotated, pivoting the L-shaped link 118. With this, the spool 128 is moved in a direction to reduce the relative displacement between the spool 128 and the sleeve 126, that is, in a direction opposite to the direction in which the sleeve 126 is moved.

It is to be noted that movement of the spool 128 is somewhat delayed as compared with that of the sleeve 126 because the operation of the hydraulic actuators 108 is carried out between the movement of the sleeve 126 driven by the step motor 122 and that of the spool 128 through the process cam 116.

Thus, with a hydraulic pressure produced in accordance with the operation degree (viz., speed change instruction value) of the step motor 122, the rollers 20 and 20. The inclining movement of the traction roller 20 thus induces an axial movement of the spool 128. When the traction rollers 20 are each inclined to a desired angular position corresponding to the speed change instruction value, that is, when the transmission 10 assumes a condition wherein a certain speed change ratio is established, the spool 128 assumes its neutral position relative to the sleeve 126.

The speed change control valve 120 and the hydraulic actuators 108 illustrated in FIG. 2 are in their neutral conditions.

In accordance with the present invention, a unique measure is employed in order that under a speed reduction condition of the transmission, the rate of moved distance of the spool 128 relative to the rotated distance of the roller supporting member 86 is increased, while, under a speed increasing condition, the rate is reduced.

Figure 4:
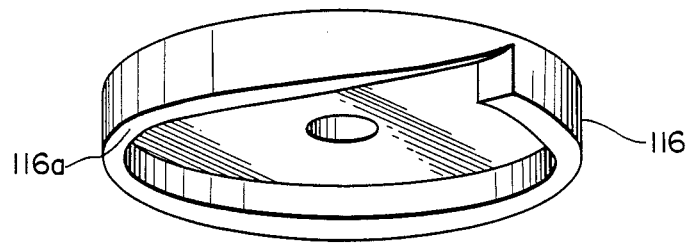
FIG. 4 is a perspective view of a unique precess cam which is employed in the invention.

In order to achieve this, the cam surface 116a of the process cam 116 is convexed as is easily understood from FIG. 4. That is, the helically turned cam surface 116a is somewhat raised at a generally middle portion thereof.

In the following, operation of the transmission 10 of the invention will be described.

As will be understood from FIG. 3, an engine torque is transmitted through the torque converter 12 to the input shaft 14, and the torque thus transmitted to the input shaft 14 is transmitted through the loading cam structure 70 to the input disc 16 and then transmitted through the traction rollers 20 to the output disc 18.

During this, &he rotation speed change ratio between the input and output discs 16 and 18 is infinitely varied depending on the angle at which each traction roller 20 inclines relative to the axis of the input shaft 14.

It is to be noted that the inclining, or pivoting, movement of each traction roller 20 is caused by the provision of the associated eccentric shaft 82 and the associated roller supporting member 86 which moves axially while being rotated about a common axis of the upper and lower bearing portions 86b and 86c.

Figure 5:
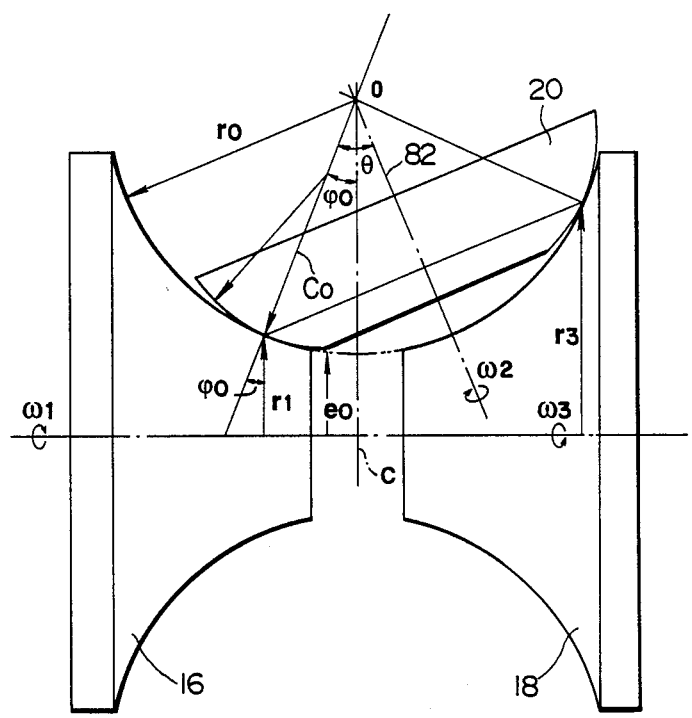
FIG. 5 is an illustration showing a positional relationship between an input disc an output disc and a traction roller.

The rotation angle of the roller supporting member 86 corresponds to an angle "$\phi_0$" at which the traction roller 20 inclines As is seen from FIG. 5, the angle "$\phi_0$" is the angle defined between a center line "C" which passes through the pivoting center "0" of the traction roller 20 and a line "$C_0$" which passes through both the pivoting center "0" and a point at which the traction roller 20 contacts the input disc 16.

It is to be noted that when the arrangement has the illustrated dimensional relationship (depicted by references "$r_0$", "$r_1$", "$r_3$" and "0", the speed change ratio "i" between the input and output discs 16 and 18 is represented by the following equation.

$$i = r_3/r_1 \tag{1}$$
$$= r_0 (1 + K - \cos(2\theta - \phi_0))/r_0 (1 + K - \cos\phi_0)$$
$$= (1 + K - \cos(2\theta - \phi_0))/(1 + K - \cos\phi_0)$$

wherein: $K = e_0/r_0$

Figure 6:
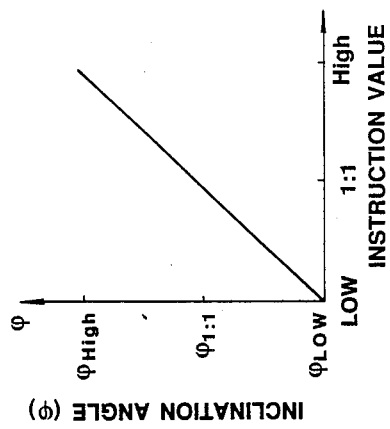
FIG. 6 is a graph showing a relationship between an instruction value from a speed change instruction means and an inclination angle of a traction roller, the relationship being practically used in the present invention.
Figure 6:
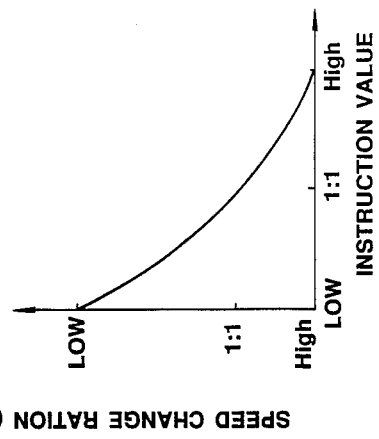
Figure 6:
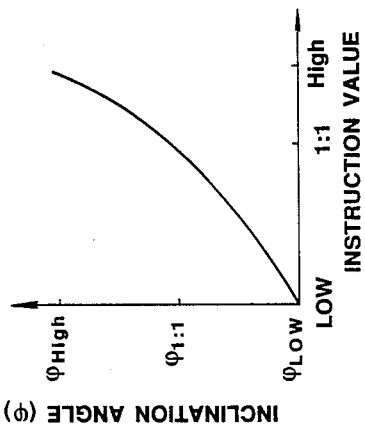

In accordance with the present invention, the cam surface 116a of the process cam 116 is convexed or somewhat bulged at its middle part. Thus, under a speed reduction condition (viz., Low speed instruction zone), the rate of the axial movement of the spool 128 relative to the rotational movement of the roller supporting member 86 is increased, while, under a speed increasing condition (viz., High speed instruction zone), the rate is reduced. Thus, the inclination angle "$\phi$" of each traction roller 20 relative to the step number of the step motor 122 has such a characteristic as depicted by a curved line in FIG. 6.

Figure 7:
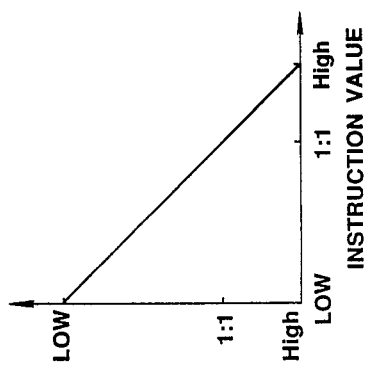
FIG. 7 is a graph showing a relationship between the instruction value and a speed change ratio, which is obtained the present invention.

When the characteristic possessed by the process cam 116 is applied to the above-mentioned equation (1), there is gained such a characteristic of the speed change ratio "i" as depicted by a straight line in FIG. 7. That is, the change rate of the speed change ratio is constant throughout entire steps of the step motor 122.

Accordingly, even when the transmission is subjected to a change of the change rate of the speed change ratio from a speed reducing condition to a speed increasing condition at the time when, for example, the vehicle is accelerating just after starting, or to a change from a speed increasing condition to a speed reducing condition at the time when, for example, the vehicle is subjected to a kickdown, the change can be suitably matched with that of the automotive engine. Thus, the undesired underoutput and acceleration shock which would be felt by the driver can be suppressed or at least minimized.

What is claimed is:

1. A continuously variable traction roller transmission comprising:
   a casing;
   input and output toroidal discs arranged in said casing to face each other;
   a pair of traction rollers each being disposed between and in engagement with said input and output discs;
   roller supporting members respectively supporting said traction rollers through respective eccentrical shafts, each roller supporting member being so arranged that when moved axially, the member is rotated about its axis while pivoting the corresponding traction roller;
   hydraulic actuators for axially moving the respective roller supporting members;
   a process cam connected to one of said roller supporting members to move therewith;
   a speed change instruction means;
   a speed change control valve including a first member which is axially moved by said speed change instruction means and a second member which is movable coaxially relative to said first member, said control valve feeding said hydraulic actuators with hydraulic pressure whose magnitude depends on the relative displacement between said first and second members;

a L-shaped pivotal link having one end pivotally connected to said second member and the other end operatively contacting with a cam surface of said process cam; and means defined by said cam surface of the process cam, said means increasing a rate of axial movement of the second member to a rotational movement of the roller supporting member when said traction rollers are in a condition for reducing the speed change ratio between said input and output discs but decreasing said rate when said traction rollers are in a condition for increasing the speed change ratio.

2. A continuously variable traction roller transmission as claimed in claim 1, in which said means comprises a convex surface formed on said precess cam.

3. A continuously variable traction roller transmission as claimed in claim 2, in which the other end of said L-shaped pivotal link is equipped with a roller which is rotatably put on said convex surface of said precess cam.

4. A continuously variable traction roller transmission as claimed in claim 3, in which said first member of said speed change control valve is a sleeve which is axially movably received in a valve body and said second member of said speed change control valve is a spool which is axially slidably received in said sleeve.

5. A continuously variable traction roller transmission as claimed in claim 4, in which said speed change control valve further comprises a spring which biases said spool in a direction to achieve a constant contact between the roller of the L-shaped link and said convex surface of said precess cam.

* * * * *